(12) United States Patent
Kim et al.

(10) Patent No.: US 8,578,503 B2
(45) Date of Patent: Nov. 5, 2013

(54) PORTABLE STORAGE DEVICE AND METHOD OF MANAGING RESOURCE OF THE PORTABLE STORAGE DEVICE

(75) Inventors: Ji-Soo Kim, Yongin-si (KR); Seon-Taek Kim, Suwon-si (KR); Byung-Gook Kim, Suwon-si (KR); Byoung-Kook Lee, Suwon-si (KR); Chan-Ik Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1482 days.

(21) Appl. No.: 12/192,543

(22) Filed: Aug. 15, 2008

(65) Prior Publication Data

US 2009/0049268 A1 Feb. 19, 2009

Related U.S. Application Data

(60) Provisional application No. 60/956,456, filed on Aug. 17, 2007.

(30) Foreign Application Priority Data

Jun. 12, 2008 (KR) .................. 10-2008-0055397

(51) Int. Cl.
*G06F 7/04* (2006.01)

(52) U.S. Cl.
USPC .................. 726/26; 726/3; 726/22; 711/163; 711/170

(58) Field of Classification Search
USPC ............ 726/3, 22, 26; 711/163, 170; 713/176
See application file for complete search history.

(56) References Cited

U.S. PATENT DOCUMENTS

| 4,755,935 | A  | * | 7/1988  | Davis et al. .................. 712/233 |
| 6,320,956 | B1 | * | 11/2001 | Cherry ..................... 379/265.02 |
| 7,581,103 | B2 | * | 8/2009  | Home et al. ................. 713/176 |
| 7,877,485 | B2 | * | 1/2011  | Piper et al. .................... 709/227 |
| 7,904,607 | B2 | * | 3/2011  | Leaming .......................... 710/8 |
| 8,028,060 | B1 | * | 9/2011  | Wyld et al. .................... 709/224 |
| 8,046,473 | B2 | * | 10/2011 | Piper et al. .................... 709/227 |
| 8,108,641 | B2 | * | 1/2012  | Goss et al. .................... 711/163 |
| 2002/0076031 | A1 | * | 6/2002 | Falcon et al. ............ 379/265.11 |
| 2002/0083200 | A1 | * | 6/2002 | Haulund et al. .............. 709/245 |
| 2006/0020548 | A1 | * | 1/2006 | Flather ........................... 705/51 |
| 2006/0059094 | A1 | * | 3/2006 | Oh et al. ......................... 705/51 |
| 2006/0059556 | A1 | * | 3/2006 | Royer ............................ 726/22 |
| 2006/0242073 | A1 | * | 10/2006 | Padawer et al. ................ 705/51 |
| 2007/0192857 | A1 | * | 8/2007 | Ben-Itzhak ..................... 726/22 |
| 2008/0071617 | A1 | * | 3/2008 | Ware .............................. 705/14 |
| 2008/0097922 | A1 | * | 4/2008 | Davydov et al. ................ 705/54 |
| 2008/0162170 | A1 | * | 7/2008 | Kumar et al. ..................... 705/1 |
| 2008/0244109 | A1 | * | 10/2008 | Lee et al. ........................ 710/19 |

* cited by examiner

Primary Examiner — April Y Blair
(74) Attorney, Agent, or Firm — Sughrue Mion, PLLC

(57) ABSTRACT

Provided are a portable storage device and a method of managing a resource of the portable storage device. The method includes converting a first DRM application into a ready status from an idle status if task processing of the first DRM application is required, and converting the first DRM application into a pending status and a second DRM application into the ready status from the idle status if task processing of the second DRM application is required.

6 Claims, 8 Drawing Sheets

PORTABLE STORAGE DEVICE AND METHOD OF MANAGING RESOURCE OF THE PORTABLE STORAGE DEVICE

CROSS-REFERENCE TO RELATED APPLICATION

This application claims priority from U.S. Patent Application No. 60/956,456 filed on Aug. 17, 2007 in the USPTO and Korean Patent Application No. 10-2008-0055397 filed on Jun. 12, 2008 in the Korean Intellectual Property Office, the disclosure of which is incorporated herein by reference in its entirety.

FIELD OF THE INVENTION

Apparatuses and methods consistent with the present invention relate to a portable storage device and efficiently managing the limited resource of the portable storage device.

SUMMARY OF THE INVENTION

Research into Digital Rights Management (DRM) in recent times has been ongoing and active. Commercial services applying DRM have been introduced and many more are set to launch. DRM refers to technologies that protect digital content which is easily copied and distributed without permission.

Although there have been attempts to protect digital content in the past, conventional methods have relied upon preventing unauthorized access to digital content. That is, access to digital content is given to users who have paid a fee, while it is denied to users who have not paid a fee. However, the nature of digital data is such that it may be easily reused, processed, copied, and then distributed. So, for example, a user may pay a fee and thereby get access to digital content, then subsequently perform unauthorized copying and distribution of the digital content, ultimately allowing users who have not paid the fee access to the digital content.

To remedy this problem, DRM encrypts digital content before it is distributed. In order to use the encrypted digital content, a specific license referred to as a rights object (RO) is required.

Users may store encrypted digital content and ROs in devices, such as mobile phones or personal digital assistances (PDAs), for reproducing digital content. However, techniques are being developed to manage ROs through portable storage devices, such as memory sticks or Multi-Media Cards (MMCs), in an effort to simplify storage and distribution of encrypted digital content and ROs.

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, aspects of the present invention provide a portable device and a method of efficiently managing a resource of the portable storage device.

According to an aspect of the present invention, there is provided a method of managing a resource of a portable storage device which is connected to a host device, the method including: converting a first DRM application into a ready status from an idle status if task processing of the first DRM application is required; and converting the first DRM application into a pending status and a second DRM application into the ready status from the idle status if task processing of the second DRM application is required.

According to another aspect of the present invention, there is provided a portable storage device including: an application driver which runs at least one DRM application; and a controller which allots a memory space for task processing of the DRM application or stores session context information of the DRM application in a security storage region, depending on an operating status of the running DRM application.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EXEMPLARY EMBODIMENTS

Figure 1:
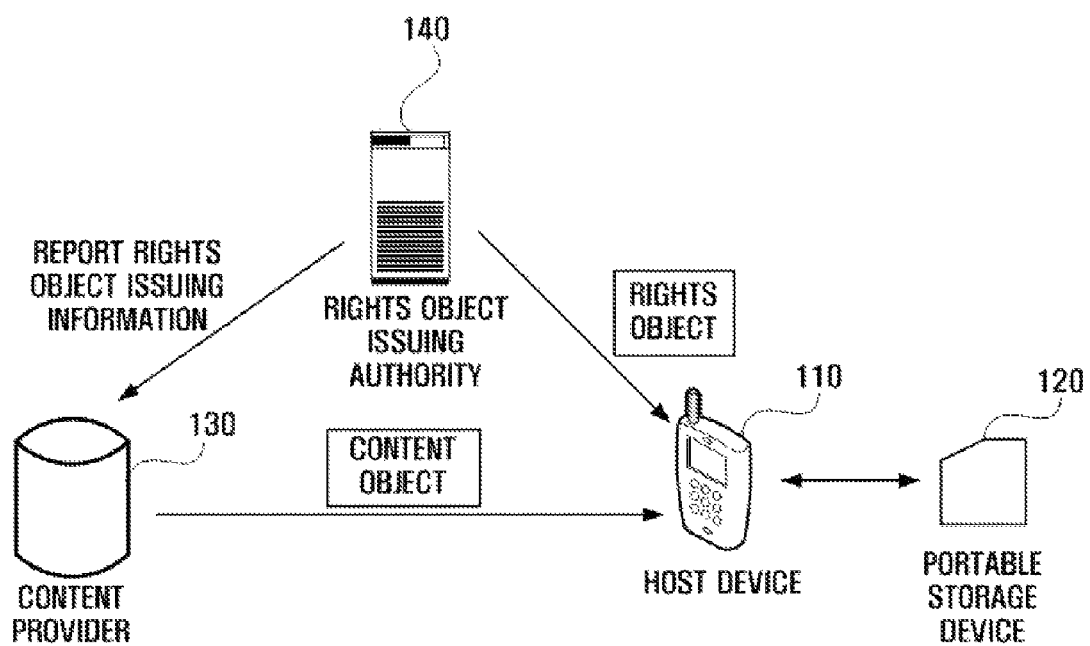
FIG. 1 is a schematic diagram used to describe DRM concepts according to an exemplary embodiment of the present invention.

The various aspects and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention is defined by the appended claims. Like reference numerals refer to like elements throughout the specification.

A brief explanation of the terms used in describing the present invention will be provided below. The following explanation is provided merely to aid in the understanding of the present invention, and the present invention should not be construed as being limited in any sense to the explanation of terms to follow.

—Content Object

A content object is digital content that is protected by Digital Rights Management (DRM). That is, a content object is digital content in a state encrypted by an encryption key.

Digital content may refer to video, still images, audio, games, and text, but is not limited to these examples.

—Rights Object (RO)

A rights object (RO) is a type of license that provides the right to use a content object. An RO may include a content encryption key, limitation information indicating the number of times, a time period, or a deadline that a content object may be played back using an RO, and a content object identifier for identifying which content object that can be played back using the content encryption key.

—Host Device

A host device may be connected to a portable storage device, and refers to a digital device that can use an RO to play back a content object. A host device may be a portable content play back device, such as a mobile phone, a PDA, or an MP3 player, or may be a stationary-type content play back device, such as a desktop computer or a digital TV.

—Portable Storage Device

A portable storage device is storage device which includes a non-volatile memory that allows for reading, writing, and erasing data, such as a flash memory. Further, a portable storage device has a predetermined data computing power, and easily connects with and separates from a host device. Examples of a portable storage device include a smart media memory card, a memory stick, a CF card, an XD card, an SD card, and a multimedia card.

—Public-Key Cryptography

Public-key cryptography, which is also referred to as asymmetric-key cryptography, is an encryption method in which the key used for encrypting data and the key used for decrypting data are different. In public-key cryptography, a pair of cryptographic keys are utilized, namely, a public key and a private key. The public key does not need to be kept in secret and may be easily known by other devices, while the private key is known only by a specific device. Examples of public-key cryptography algorithms include those associated with the following techniques: Diffie-Hellman, RSA, ElGamal, and elliptical curve.

—Symmetric-Key Cryptography

Symmetric-key cryptography, which is also referred to as secret-key cryptography, is an encryption method in which the key used for encrypting data is the same as the key used for decrypting data. Examples of symmetric-key cryptography include DES and AES.

—Random Numbers

Random numbers refer to a string of numbers, a string of characters, or a combination thereof having a certain degree of randomness.

Terms not described above will be explained as needed in the following description.

A method of managing a resource of a portable storage device and a portable storage device using the method according to exemplary embodiments of the present invention are described hereinafter with reference to the block diagrams and flowchart illustrations. It will be understood that each block of the flowchart illustrations, and combinations of blocks in the flowchart illustrations, can be implemented by computer program instructions.

These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which comprises one or more executable instructions for implementing the specified logical function(s).

It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a schematic diagram used to describe DRM concepts according to an exemplary embodiment of the present invention.

In an exemplary embodiment of the present invention, a user obtains a content object from a content provider 130 via a host device 110. An RO is needed to use the content object supplied by the content provider 130. Accordingly, the user pays a predetermined fee and purchases an RO that is able to access the content object from an RO issuing authority 140. Following such an operation, the RO issuing authority 140 may then report related RO issuing information to the content provider 130. In some exemplary embodiments, the RO issuing authority 140 and the content provider 130 may be parts of a single institution.

Although the user may store the purchased RO in the host device 110, in one exemplary embodiment of the present invention, the purchased RO is stored in a portable storage device 120. In some exemplary embodiments, one or more ROs are stored in the portable storage device 120 at the time of manufacture of the portable storage device 120.

The user connects the portable storage device 120, in which is stored the RO, to the host device 110, and the host device 110 then uses the RO stored in the portable storage device 120 to play back the content object.

Figure 2:
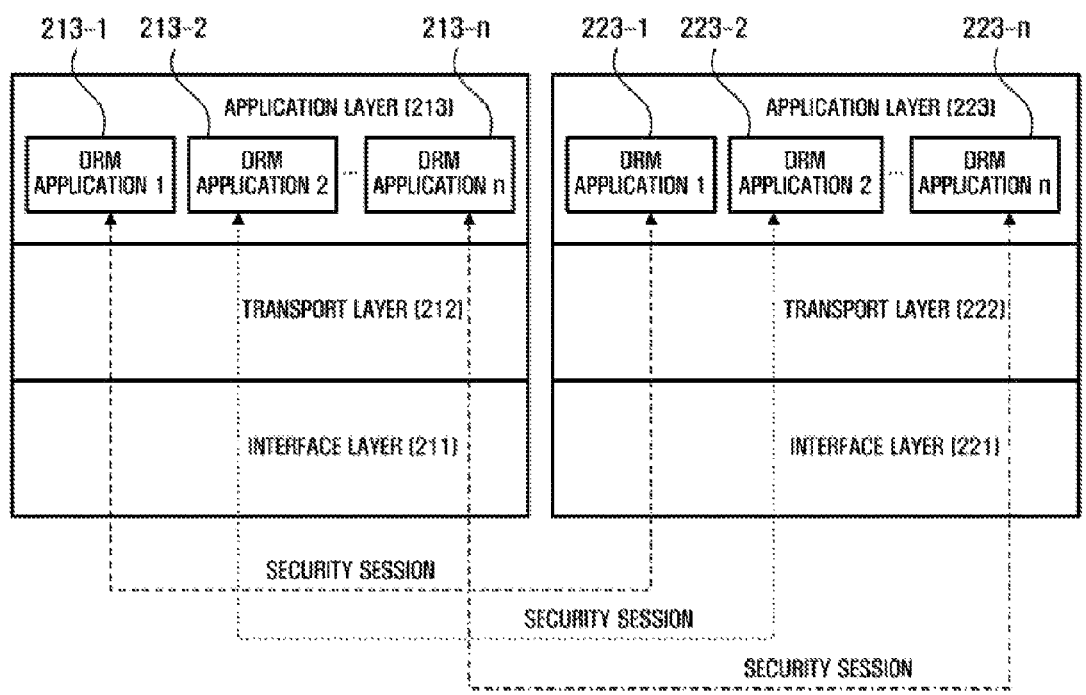
FIG. 2 is a schematic diagram of a stack structure of a host device and a portable storage device according to an exemplary embodiment of the present invention.

FIG. 2 is a schematic diagram of a stack structure of the host device 110 and the portable storage device 120 according to an exemplary embodiment of the present invention.

The host device 110 includes an interface layer 211 which is responsible for physically connecting with the portable storage device 120, a transport layer 212 responsible for transmission and reception of messages or data with respect to the portable storage device 120, and an application layer 213. In the present invention, the application layer 213 may support a plurality of Digital Rights Management (DRM) applications 213-1, 213-2, 213-n. Examples of DRM applications that can be supported by the application layer 213 include an Open Mobile Alliance (OMA) DRM application, a MICROSOFT (MS) DRM application, and an open DRM application. However, the present invention is not limited with respect to the DRM applications that can be supported by the application layer 213.

The portable storage device 120 has the same stack structure as the host device 110. In particular, portable storage device 120 includes an interface layer 221 which is responsible for physically connecting with the host device 110, a transport layer 222 responsible for transmission and reception of messages or data with respect to the host device 110, and an application layer 223. The application layer 223 of the portable storage device 120 may similarly support a plurality of DRM applications 223-1, 223-2, 223-n.

Prior to connection of the host device 110 with the portable storage device 120 for access to the RO stored in the latter, mutual authentication is performed between the host device 110 and the portable storage device 120. Mutual authentication is a basic process performed to maintain the security of data exchanged between the host device 110 and the portable storage device 120.

In some exemplary embodiments, authentication is performed between the host device 110 and the portable storage device 120 for each DRM application. For example, in the case where the host device 110 desires to use an OMA DRM application, the portable storage device 120 also runs an OMA DRM application. At this time, the host device 110 and the portable storage device 120 establish a security session for the OMA DRM application through a mutual authentication operation. In a state where a security session for an OMA DRM application is established, if the host device 110 and the portable storage device 120 desire to use an MS DRM application, the host device 110 and the portable storage device 120 again perform a mutual authentication operation in order to establish a security session for the MS DRM application. Hence, in some exemplary embodiments, every time a DRM application is run, a security session for the corresponding DRM application is established.

Figure 3:
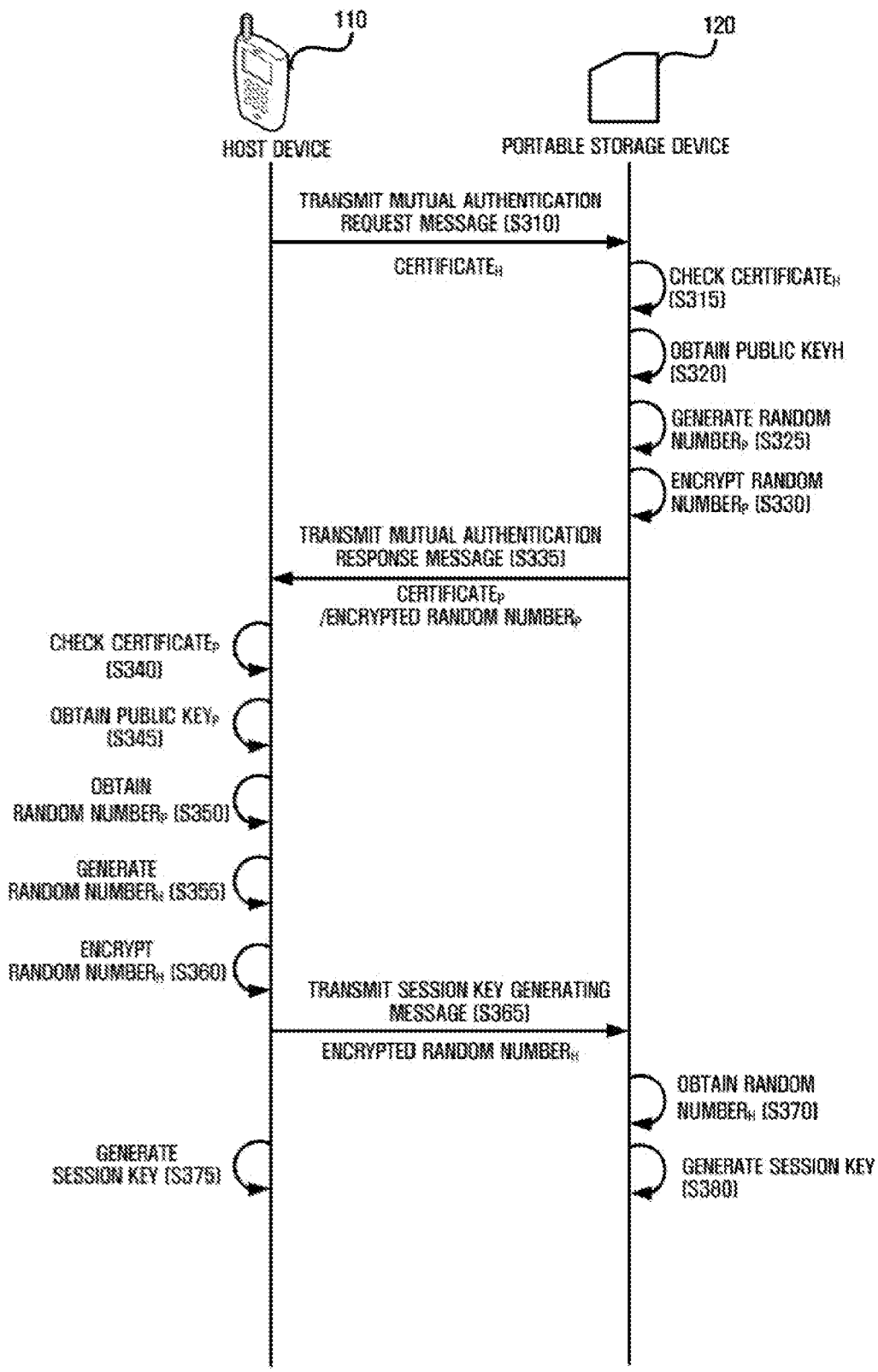
FIG. 3 is a flowchart of a mutual authentication process according to an exemplary embodiment of the present invention.

FIG. 3 is a flowchart of a mutual authentication process according to an exemplary embodiment of the present invention.

In this exemplary embodiment, data transmitted between the host device 110 and the portable storage device 120 that is indicated with the subscript "H" is data which is possessed or generated by the host device 110, and data transmitted between the host device 110 and the portable storage device 120 that is indicated with the subscript "P" is data which is possessed or generated by the portable storage device 120.

First, if the host device 110 and the portable storage device 120 are interconnected, the host device 110 transmits a mutual authentication request message to the portable storage device 120 in operation S310. The mutual authentication request message includes a Certificate$_H$ issued to the host device 110 by a certification authority. The Certificate$_H$ includes an ID$_H$ for identifying the host device 110 and a public key$_H$ of the host device 110. Further, the Certificate$_H$ may become a digital signature using a private key of the certification authority.

After receiving the mutual authentication request message from the host device 110, the portable storage device 120 determines whether the Certificate$_H$ included in the mutual authentication request message is still effective in operation 315. The effectiveness of the Certificate$_H$ may be determined from a Certificate Revocation List (CRL). The CRL may have been stored in the portable storage device 120 at the time of manufacture thereof, or may have been obtained from the host device 110 or another device when previously connected to the host device 110 or the "another device."

If the Certificate$_H$ of the host device 110 is registered in the CRL, the portable storage device 120 determines that the Certificate$_H$ is ineffective, and mutual authentication with the host device 110 is rejected. However, if the Certificate$_H$ of the host device 110 is not registered in the CRL, the portable storage device 120 determines that the Certificate$_H$ is effective, and obtains the public key$_H$ of the host device 110 from the Certificate$_H$ in operation 320.

Further, the portable storage device 120 generates a random numbers in operation S325, and encrypts the random number$_P$ using the public key$_H$ of the host device 110 in operation S330.

Next, the portable storage device 120 transmits a mutual authentication response message to the host device 110 in operation S335. The mutual authentication response message may include a Certificate$_P$ issued to the portable storage device 120 by a certification authority and the random numbers encrypted in operation S330. The Certificate$_P$ includes an ID$_P$ for identifying the portable storage device 120 and a public key$_P$ of the portable storage device 120. Further, the Certificate$_P$ may become a digital signature using a private key of the certification authority.

After receiving the mutual authentication response message from the portable storage device 120, the host device 110 determines whether the Certificate$_P$ included in the mutual authentication response message is still effective in operation 340. The effectiveness of the Certificate$_P$ may be determined from a CRL. The CRL may have been stored in the host device 110 at the time of manufacture thereof, or may have been previously obtained from a CRL issuing authority by the host device 110 connecting to the CRL issuing authority (which may be part of the same institution as the certificate issuing authority) via the Internet or a mobile communications network. Of course, the CRL may have been obtained by the host device 110 from another device through previous connection with such a device.

If the Certificate$_P$ of the portable storage device 120 is registered in the CRL, the host device 110 determines that the Certificate$_P$ is ineffective, and mutual authentication with the portable storage device 120 is discontinued. However, if the Certificate$_P$ of the portable storage device 120 is not registered in the CRL, the host device 110 determines that the Certificate$_P$ is effective, and obtains the public key$_P$ of the portable storage device 120 from the Certificate$_P$ in operation 345. Further, the host device 110 decrypts the encrypted random numbers included in the mutual authentication response message using its own private key to thereby obtain a random numbers in operation S350.

The host device 110 generates a random number$_H$ in operation S355, and, in operation S360, encrypts the generated random number$_H$ using the public key$_P$ of the portable storage device 120 obtained in operation S345.

Next, the host device 110 transmits a session key generating message to the portable storage device 120 in operation S365. The session key generating message includes the random number$_H$ encrypted in operation S360.

After receiving the session key generating message from the host device 110, the portable storage device 120 decrypts the encrypted random number$_H$ included in the session key generating message using its own private key$_P$ to thereby obtain a random number$_H$ in operation S370.

Accordingly, the host device 110 and the portable storage device 120 come to share two random numbers, namely, random number$_H$ and random number$_P$. Each of the host device 110 and the portable storage device 120 generates a session key using the random numbers, i.e., random number$_H$ and random numbers, in operations S375, S380. The host device 110 and the portable storage device 120 have the same key generating algorithm such that the session keys generated by the host device 110 and the portable storage device 120 are identical.

Following mutual authentication, the host device 110 encrypts data to be sent to the portable storage device 120 using the session key and the portable storage device 120 encrypts data to be sent to the host device 110 using the session key. The host device 110 and the portable storage device 120 then decrypt the received data using their session keys which are identical as described above. Hence, security in data transmission between the host device 110 and the portable storage device 120 is maintained.

The mutual authentication process described above is one exemplary embodiment of the present invention, and the present invention is not limited in this regard. Accordingly, some of the operations in the process shown in FIG. 3 may be omitted or new operations may be added thereto. Further, various information or parameters exchanged in the mutual authentication process described above may also be varied in some exemplary embodiments.

As described above, every time a new DRM application is run, the mutual authentication process as shown in FIG. 3 is performed. Accordingly, if a plurality of DRM applications are run, the mutual authentication process is repeated a number of times, with a security session being established for each DRM application that is run.

Compared to the host device 110, the portable storage device 120 is limited with respect to data processing capability. Accordingly, even if the portable storage device 120 is able to run a plurality of DRM applications, the main memory and the computing power of the portable storage device 120 may not be sufficient for simultaneously executing a plurality of DRM applications. In one exemplary embodiment of the present invention, the portable storage device 120 establishes operating statuses for DRM applications such that the limited resource of the portable storage device 120 is utilized to allow a plurality of DRM applications to be effectively run.

Figure 4:
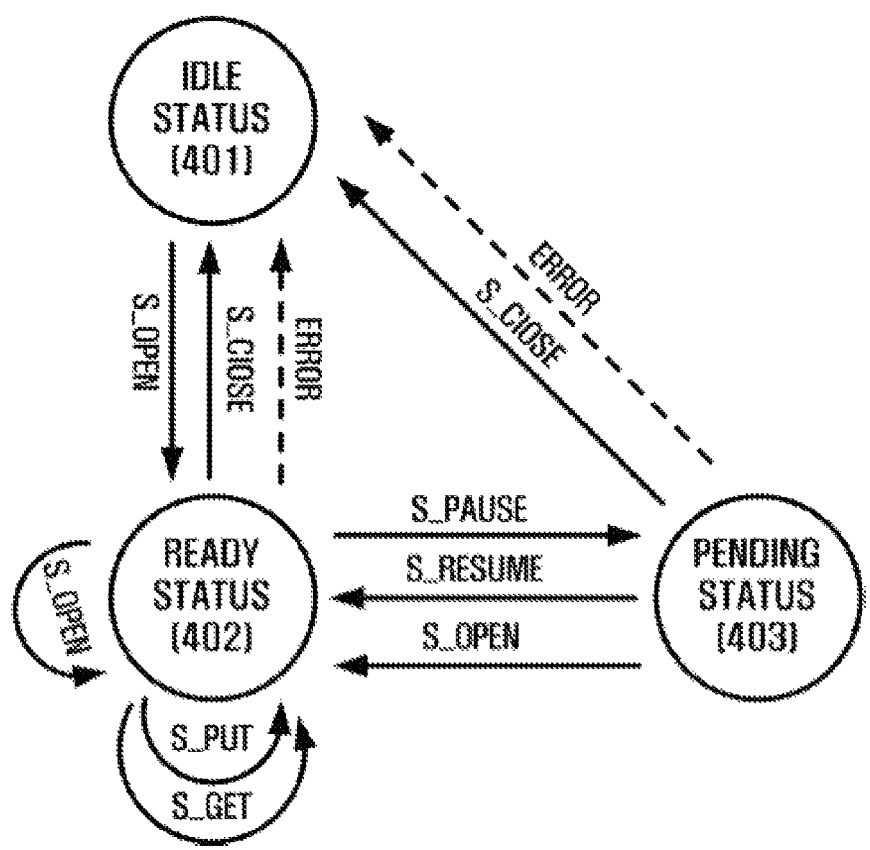
FIG. 4 is a schematic diagram illustrating operating statuses of a DRM application according to an exemplary embodiment of the present invention.

FIG. 4 is a schematic diagram, illustrating operating statuses of a DRM application according to an exemplary embodiment of the present invention. The illustrated operating statuses of a DRM application include an idle status 401, a ready status 402, and a pending status 403. The idle status 401 indicates a status in which the DRM application is not being run. The ready status 402 is a status in which the DRM application is being run, and in which tasks are being performed or may be performed at any time in accordance with a request from the host device 110. The pending status 403 indicates a status in which the DRM application is being run, but no particular task is yet required.

In one exemplary embodiment, the initial status of all DRM applications is the idle status 401. If task processing using a first DRM application is required, the portable storage device 120 converts the status of the first DRM application from the idle status 401 to the ready status 402. A memory space of a predetermined size is allotted for task processing of the first DRM application in the main memory (e.g., a random access memory) where there are loaded the codes, data, messages, and other various types of information that are used when the portable storage device 120 runs the DRM application or processes predetermined tasks. The size of the allotted memory space may vary depending on the type of the first DRM application or the performance of the portable storage device 120.

When the first DRM application is in the ready status 402, if task processing using a second DRM application that is in the idle status 401 or the pending status 403 is required, the portable storage device 120 converts the operating status of the first DRM application to the pending status 403, and the operating status of the second DRM application to the ready status 402. Furthermore, the portable storage device 120 frees up the memory space allotted to the first DRM application, and the task data processed by the first DRM application and session context information that includes security information (for example, a session key) required to maintain the security session of the first DRM application may be stored in a security storage region. Subsequently, the portable storage device 120 allots memory space needed for task processing of the second DRM application. The size of the allotted memory at this time may vary depending on the type of the second DRM application or the performance of the portable storage device 120.

Next, if task processing of the first DRM application is required, the portable storage device converts the status of the first DRM application into the ready status 402, and allots memory space for task processing of the first DRM application. At this time, the session context information of the first DRM application stored in the security storage area is moved to the memory space allotted to the first DRM application. Moreover, the status of the second DRM application is converted to the pending status 403, and the memory space allotted to the second DRM application is freed up. Of course, also in this case, session context information of the second DRM application is stored in the security storage region.

The security storage region is a storage region that is logically or physically blocked from access by other devices or applications, and a plurality of security storage regions may be present in the portable storage device 120. Different types of data or information requiring security, such as an RO, may be stored in the security storage regions. In one exemplary embodiment, the session context information is stored in a security storage region that is separated from security storage regions storing other data.

The portable storage device 120 varies the operating status of each DRM application supported thereby according to requests made by the host device 110. Table 1 below illustrates an example of messages transmitted by the host device 110 to the portable storage device 120 for operation of DRM applications. It is noted that while the term "messages" is used, the present invention is not limited in this respect and other terms may be used for describing the contents of Table 1 that indicate instructions, commands, requests, and other types of terms indicating information or data or signals transmitted between devices for executing tasks, etc.

TABLE 1

| Name | Information |
| --- | --- |
| Application Open | S_OPEN |
| Application Close | S_CLOSE |
| Secure Put | S_PUT |
| Secure Get | S_GET |
| Application Pause | S_PAUSE |
| Application Resume | S_RESUME |

In Table 1, the Application Open message is used when a DRM application in the idle status is converted into the ready status, and the Application Close message is used when a DRM application in the ready status or the pending status is converted into the idle status.

Further, the Application Pause message is used when a DRM application in the ready status is converted into the pending status, and the Application Resume message is used when a DRM application in the pending status is converted into the ready status.

The Secure Put message does not affect the operating status of a DRM application, and instead is used when information is transmitted to the portable storage device 120. The Secure Get message also does not affect the operating status of a DRM application, and instead is used when information is requested from the portable storage device 120. If there is an error when a DRM application is in the ready status 402 or the pending status 403, the operating status of the DRM application is converted into the idle status 401.

Depending on the message, an application identifier for identifying the DRM application to be run may be included in the messages transmitted from the host device 110 to the portable storage device 120. Accordingly, the portable storage device 120 may transfer the messages from the host device 120 to the suitable DRM applications.

As shown in FIG. 4, the Application Open message may be used also when a DRM application is in the ready status 402 or the pending status 403. In this case, the security information in the session context data of the of the DRM application may be maintained in its present state, and the task data of the DRM application that was processed may be deleted or reset. That is, when a DRM application that was in the ready status 402 or the pending status 403 is converted into the ready status 402 after first being converted into the idle status 401, it is necessary to perform a mutual authentication process as shown in FIG. 2. However, when a DRM application that was in the ready status 402 or the pending status 403 is converted again directly into the ready status 402, no mutual authentication is required.

Figure 5:
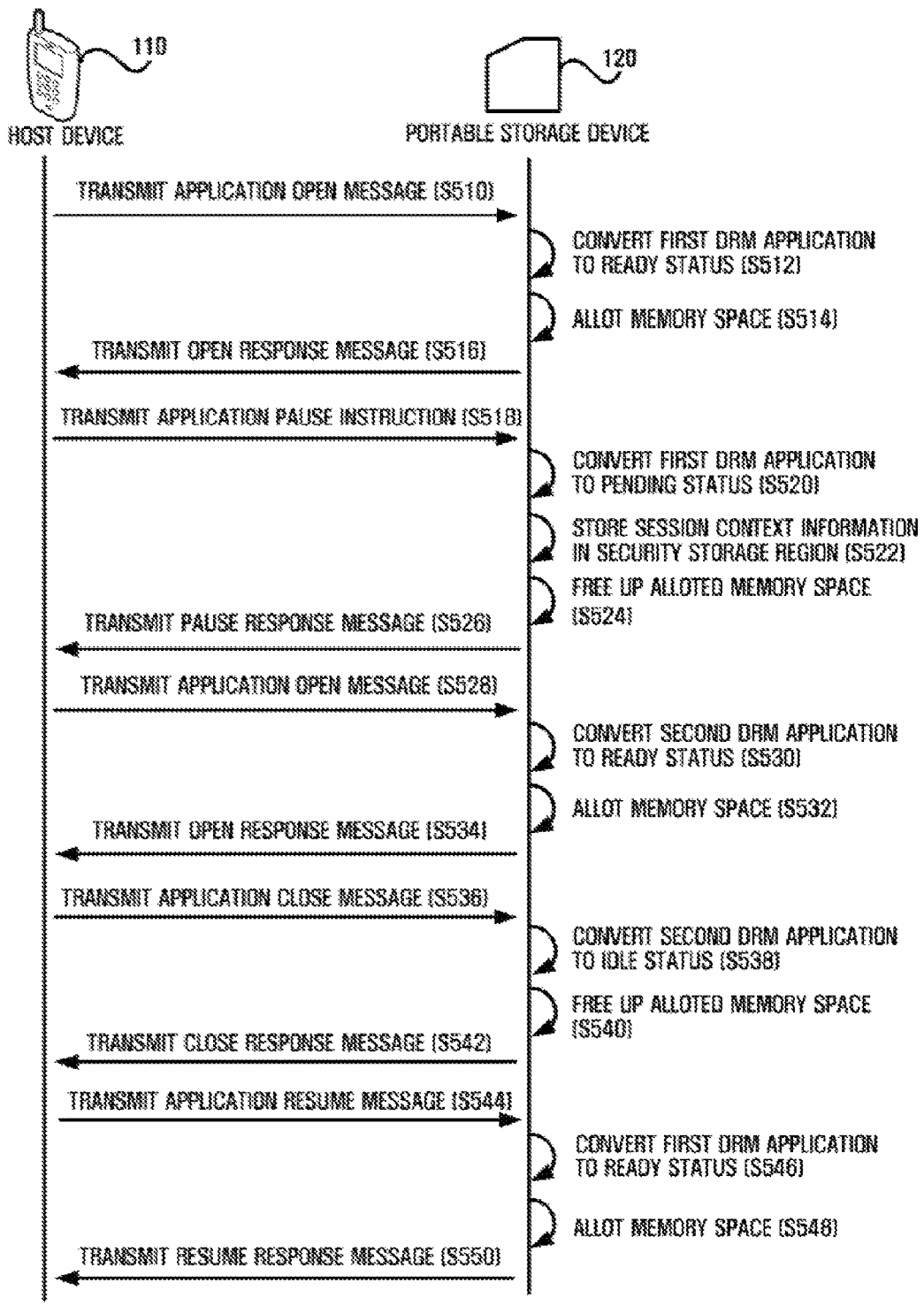
FIG. 5 is a flowchart of a DRM application running process according to an exemplary embodiment of the present invention.

FIG. 5 is a flowchart of a DRM application running process according to an exemplary embodiment of the present invention. In this exemplary embodiment, it is assumed that each of the host device 110 and the portable storage device 120 possess a first DRM application and a second DRM application. However, the present invention is not limited in this respect.

An initial status of each of the first DRM application and the second DRM application of the portable storage device is the idle status. When the host device 110 desires to perform DRM tasks using the first DRM application, an Application Open message is sent to the portable storage device 120 by the host device 110 in operation S510. The Application Open message may include an application identifier of the first DRM application such that the portable storage device 120 is able to determine through the application identifier that the application open instruction is that related to the first DRM application. In the following, even when not explicitly stated, it is to be assumed that the portable storage device 120 is able to determine to which DRM application a message received from the host device 110 is related through an application identifier contained in the transmitted message.

After receiving the Application Open message from the host device 110, the portable storage device 120 converts the operating status of the first DRM application to the ready status in operation S512. That is, in operation S512, the first DRM application may be run. At this time, the portable storage device 120, in operation S514, allots a memory space for task processing of the first DRM application whose status was converted into the ready status, and transmits an open response message to the host device 110 in operation S516.

A mutual authentication operation for establishing a security session for the first DRM application may be performed between the host device 110 and the portable storage device 120. A description with respect to mutual authentication is provided above with reference to FIG. 2. In one exemplary embodiment, if the mutual authentication operation is discontinued, the operating status of the first DRM application is converted into the idle status. Such an exemplary embodiment is applicable also to other DRM applications.

If mutual authentication results in establishing a security session, each of the host device 110 and the portable storage device 120 executes a DRM task using the first DRM application. An example of a DRM task is that in which the host device 110 plays back a content object using an RO stored in the portable storage device 120. During the DRM operation, a Secure Put message or a Secure Get message may be used for transmission of various data or information.

In a state where the first DRM application is in the ready status 402, task processing using the second DRM application may be needed. In this case, the host device 110 transmits an Application Pause message, which includes an application identifier of the first DRM application, to the portable storage device 120 in operation S518.

The portable storage device 120 converts the operating status of the first DRM application into the pending status in operation S520. At this time, the portable storage device 120 stores the session context information of the first DRM application in a security storage region in operation S522. Accordingly, the security information of the first DRM application is protected and not deleted, and the security session of the first DRM application is maintained.

Subsequently, the portable storage device 120 frees up the memory space allotted for the first DRM application in operation S524, and transmits a pause response message to the host device 110 in operation S526.

Next, the host device 110 transmits an Application Open message, which includes an application identifier of the second DRM application, to the portable storage device 120 in operation S528.

The portable storage device 120 then converts the operating status of the second DRM application to the ready status in operation S530, and allots a memory space for task processing of the second DRM application in operation S532. Next, the portable storage device 120 transmits an open response message to the host device 110 in operation S534.

At this time, a mutual authentication operation for establishing a security session of the second DRM application may be performed between the host device 110 and the portable storage device 120. If the security session of the second DRM application is established, each of the host device 110 and the portable storage device 120 may perform a DRM task using the second DRM application.

If task processing of the second DRM application is no longer required and the second DRM application must be closed, the host device 110 transmits an Application Close message, which includes an application identifier of the second DRM application, to the portable storage device 120 in operation S536.

After receiving the Application Close message, the portable storage device 120 converts the operating status of the second DRM application to the idle status in operation S538, and frees up the memory space allotted for the second DRM application in operation S540. At this time, the security information in the session context information of the second DRM application is deleted, and if there is task data for which processing has not been completed, this is also deleted. Next, the portable storage device 120 transmits a close response message to the host device 110 in operation S542.

If task processing of the first DRM application, which is in the pending status, is required, the host device 110 transmits an Application Resume message, which includes an application identifier of the first DRM application, to the portable storage device 120 in operation S544.

The portable storage device 120 then converts the operating status of the first DRM application to the ready status in operation S546, and allots memory space for task processing of the first DRM application in operation S548. At this time, the portable storage device 120 may move part or all of the session context information of the first DRM application that is stored in the security storage region to the allotted memory space in operation S548.

Next, the portable storage device 120 transmits a resume response message to the host device in operation S550. Hence, DRM tasks using the first DRM application may be performed between the host device 110 and the portable storage device 120. Since the security session of the first DRM application is maintained, it is not necessary to perform a mutual authentication operation for establishing a security session of the first DRM application between the host device 110 and the portable storage device 120.

Through such a process, the portable storage device 120 utilizes its limited resource to effectively run a plurality of DRM applications. Of course, in some exemplary embodiments, a plurality of DRM applications may be simultaneously run in the ready status. However, since the resource of the portable storage device 120 is extremely limited in most cases, it is preferable when using a plurality of DRM applications that only the DRM application needed at a particular time for task processing be placed in the ready status, and the remainder of the DRM applications be placed in the pending status.

The size of the memory space needed to run each of a plurality of DRM applications supported by the portable storage device 120 may vary depending on the type of the DRM application. Accordingly, the size of the memory space that can be used as a data buffer in the main memory of the portable storage device 120 may vary depending on the DRM application that is run by the portable storage device 120. As a result, when a DRM task is executed between the portable storage device 120 and the host device 110, the portable storage device 120 may inform the host device 110 of the size of the data buffer that may be used, and the host device 110 may vary the size of the DRM task message transmitted to the portable storage device 120 according to the size of the usable data buffer of the portable storage device 120.

Figure 6:
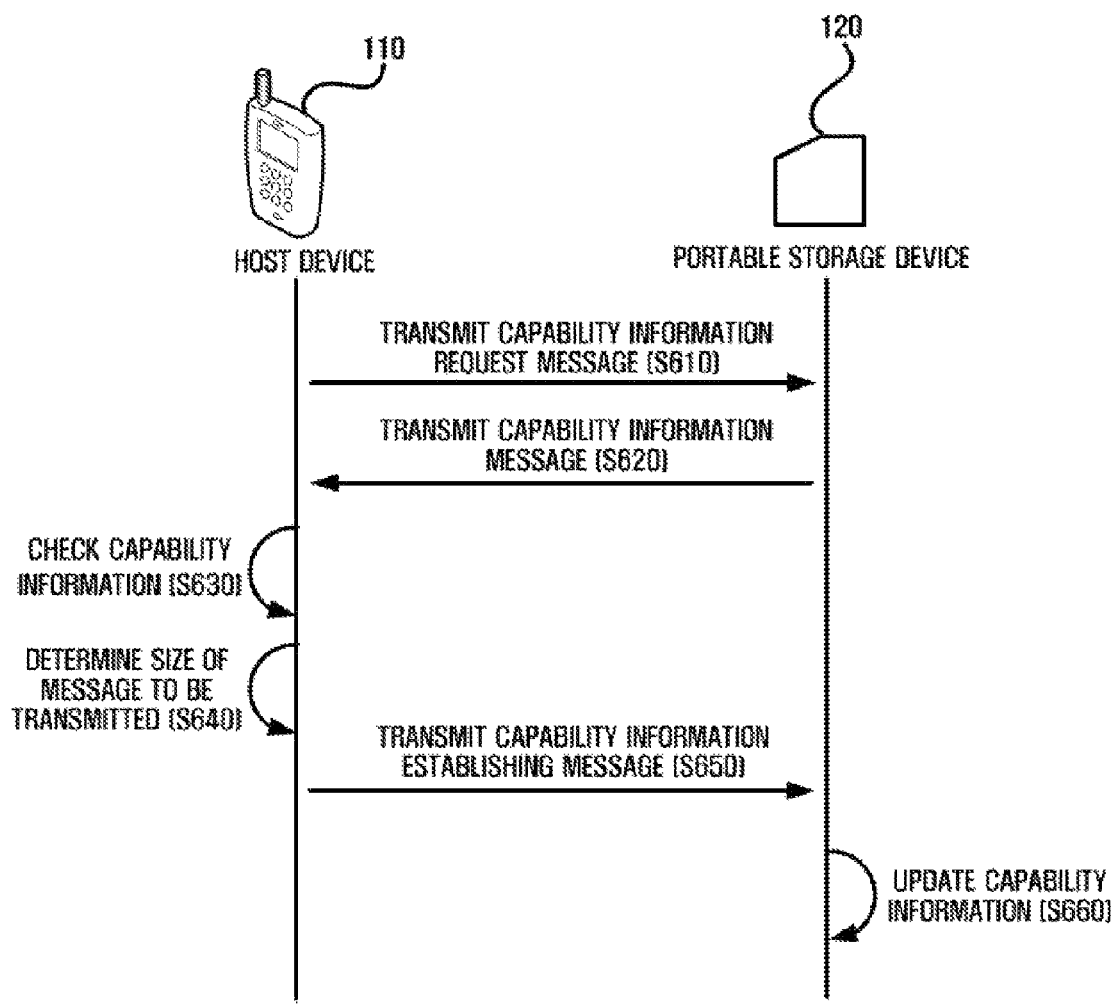
FIG. 6 is a flowchart of a process in which a host device obtains information of a portable storage device according to an exemplary embodiment of the present invention.

FIG. 6 is a flowchart of a process in which the host device 110 obtains information of the portable storage device 120 according to an exemplary embodiment of the present invention.

It is to be assumed that after connection of the host device 110 with the portable storage device 120, a status of a particular DRM application is converted into the ready status in accordance with a request of the host device 110. This may encompass the situation in which a DRM task is not being executed through the DRM application which is in the ready status (for example, before executing operation S518 of FIG. 5). Accordingly, the process of FIG. 6 may be that performed prior or subsequent to a mutual authentication operation between the host device 110 and the portable storage device 120 for the DRM application which is in the ready status.

The host device 110 transmits a capability information request message to the portable storage device 120 in operation S610.

The portable storage device 120, in response to the capability information request message of the host device 110, transmits a capability information message that contains its capability information to the host device 110 in operation S620. An example of the capability information message transmitted by the portable storage device 120 to the host device 110 is shown in Table 2 below.

TABLE 2

| Field | Information | Size (bytes) |
|---|---|---|
| 1 | Version | 1 |
| 2 | Reserved | 3 |
| 3 | Supported Application List | 2 |
| 4 | Supported Protocol List | 2 |
| 5 | Presently Used Protocol | 2 |
| 6 | Maximum Security Storage Region Size | 2 |
| 7 | Usable Security Storage Region Size | 2 |
| 8 | Maximum Buffer Size | 2 |
| 9 | Buffer Size to be Used | 2 |
| 10 | Maximum DRM Processing Time | 2 |
| 11 | 1st Status Word | 1 |
| 12 | 2nd Status Word | 1 |
| 13 | Reserved | 233 |

In the capability information message shown in Table 2, field 1 indicates the type or firmware version of the portable storage device 120, field 2 and field 13 indicate reserved fields for subsequent use, field 3 indicates a list of the DRM applications supported by the portable storage device 120, field 4 indicates a list of protocols (e.g., APDU and HTTP) that can be used in a transport layer of the portable storage device 120, and field 5 indicates a protocol that is presently being used by the portable storage device 120 and that is one of the protocols in the protocol list indicated in field 4.

Field 6 indicates the maximum size of the security storage region that may be used by the portable storage device 110 to store various data or information for which security is required, such as ROs, session context information, etc. Field 7 indicates the size of the security storage region that is presently being used. Accordingly, the value established in field 7 may not exceed the value established in field 6.

Field 8 indicates the maximum buffer size that may be used by the portable storage device 120. This may be the amount of memory space remaining in the main memory of the portable storage device 120 after excluding the memory space allotted for the DRM application(s) in the ready status. Field 9 indicates the buffer size needed by the portable processing device 120 for processing the messages sent from the host device 110. The buffer size established in field 9 may not exceed the maximum buffer size established in field 8. Furthermore, the buffer size established in field 9 may alter various conditions present in different exemplary embodiments such as the type of the DRM application(s) in the ready status and the calculating power of the portable storage device 120.

Among the capability information of the portable storage device 120, the "Presently Used Protocol" and "Buffer Size to be Used" may be re-established by the host device 110.

Referring again to FIG. 6, after the capability information message is received from the portable storage device 120, the host device 110 checks the capability information of the portable storage device 120 in the capability information message in operation S630. In operation S630, the host device 110 is able to ascertain the maximum buffer size of the portable storage device 120, and in accordance with this maximum buffer size, determines the size of the message to be sent to the portable storage device 120 for executing a DRM task in operation S640. The message size determined in operation S640 does not exceed the maximum buffer size established in field 8 of the capability information message received from the portable storage device 120, and may be identical to or different from the buffer size to be used that is established in field 9. In some exemplary embodiments, the host device 110 determines the message size to be identical to the maximum buffer size so that the presently usable buffer size in the portable storage device 120 may be fully utilized.

Subsequently, the host device 110 transmits a capability information establishing message to the portable storage device 120 in operation S650. The capability information establishing message may include the "Buffer Size to be Used" which is identical to the message size determined in operation S640.

The portable storage device 120 uses the "Buffer Size to be Used" included in the capability information establishing message to update its capability information in operation S660. Accordingly, the portable storage device 120 is able to estimate that the message size to be subsequently transmitted from the host device 110 is identical to the "Buffer Size to be Used" contained in its capability information, and may prepare to process such a message.

Following the above, a DRM task may be performed between the host device 110 and the portable storage device 120. At this time, the message size transmitted by the host device 110 to the portable storage device is identical to that determined in operation S640.

In one exemplary embodiment of the present invention, when the message size determined in operation S640 is identical to the "Buffer Size to be Used" included in the capability information received from the portable storage device 120, operations S650 and S660 may be omitted.

Further, in one exemplary embodiment of the present invention, the host device 110 determines a protocol to be used in a transport layer as one of the protocols which is included in the protocol list in the capability information received from the portable storage device 120. In this case, the host device 110 may include information indicating the protocol to be newly used in the capability information establishing message which is transmitted to the portable storage device 120 in operation S650. Accordingly, the portable storage device 120 may use the protocol established by the host device 110 for the transport layer. Of course, if the presently used protocol in the capability information received from the portable storage device 120 is to be used by the host device 110 without any change thereto, no additional operation is required in this regard.

Figure 7:
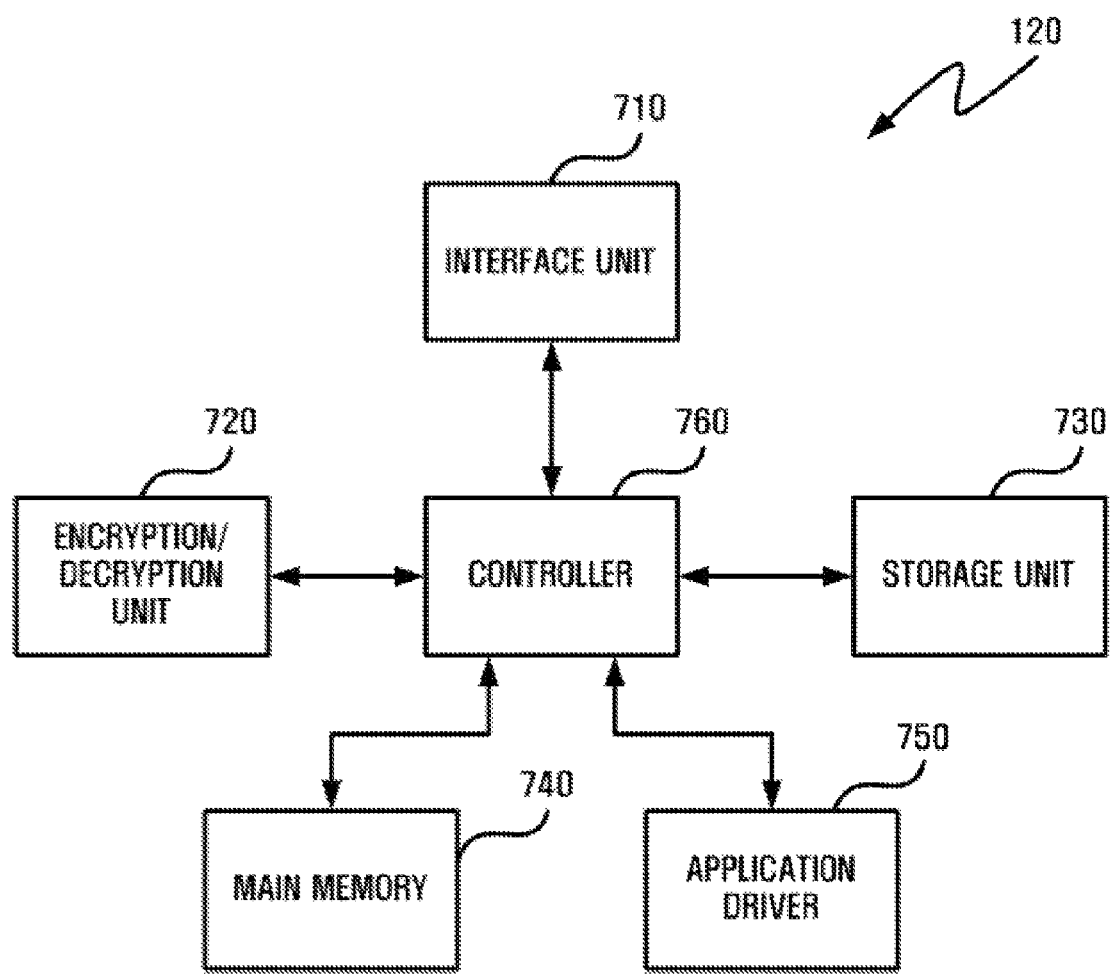
FIG. 7 is a block diagram of a portable storage device according to an exemplary embodiment of the present invention.

FIG. 7 is a block diagram of the portable storage device 120 according to an exemplary embodiment of the present invention. The portable storage device 120 includes an interface 710, an encryption/decryption unit 720, a storage unit 730, a main memory 740, an application driver 750, and a controller 760.

The interface 710 allows the portable storage device 120 to connect with the host device 110. Connection of the portable storage unit 120 with the host device 110 refers to a state in which electrical or magnetic communication may take place therebetween. Accordingly, "connect" may refer to a state of actual contact between the portable storage device 120 and the host device 110 for communication, and may also refer to a non-contact state in which communication therebetween is realized through a wireless medium. The portable storage device 120 transmits to or receives from the host device 110 various data, instructions, signals, and messages through the interface 710.

The encryption/decryption unit 720 performs encryption and decryption operations. Accordingly, the encryption/decryption unit 720 encrypts data to be sent to the host device 110, or decrypts encrypted data received from the host device 110. The encryption/decryption unit 720 may perform public-key cryptography as well as secret-key cryptography. In order to perform both types of cryptography, the portable storage device 120 may include a plurality of encryption/decryption units. Further, the encryption/decryption unit 720 may generate random numbers required during mutual authentication operations.

The storage unit 730 may store context objects, ROs, session context information, a certificate of the portable storage device 120, a CRL, and data required to perform DRM tasks. In addition to a specific DRM application(s), the storage unit 730 may include other applications or at least one security storage region for logically or physically protecting access from other devices. The storage unit 730 may include a general storage region to which access is freely permitted. The storage unit 730 may be a non-volatile memory such as a flash memory.

The main memory 740 is a memory that stores or deletes codes, data, and information required during operation of the portable storage device 120. An example of such a memory is RAM. Operation of the portable storage device 120 encompasses running of a DRM application, performing mutual authentication, and performing DRM and other tasks.

The application driver 750 drives DRM applications. Software codes for driving DRM applications may be stored in the storage unit 730, and such software codes necessary to drive DRM applications may be loaded in the main memory 740. DRM applications driven by the application driver 850 may, together with DRM applications driven by the host device 110, perform DRM tasks for playing back context objects using ROs.

The controller 760 performs operations required to allow operation of the portable storage device 120 in accordance with exemplary embodiments described above, and controls the structural elements forming the portable storage device 120. For example, the controller 760 allots a memory space for a DRM application in the ready status, and stores session context information of a DRM application whose status is converted to the pending status in a security storage region. Moreover, the controller 760 may provide capability information of the portable storage device 120 to the host device 110 through the interface 710. Additionally, the controller 760 may generate messages to be transmitted to the host device 110, and interpret messages received from the host device 110.

A more detailed description of the functions and operations of the structural elements forming the portable storage device 120 may be more fully understood from the exemplary embodiments described above.

Figure 8:
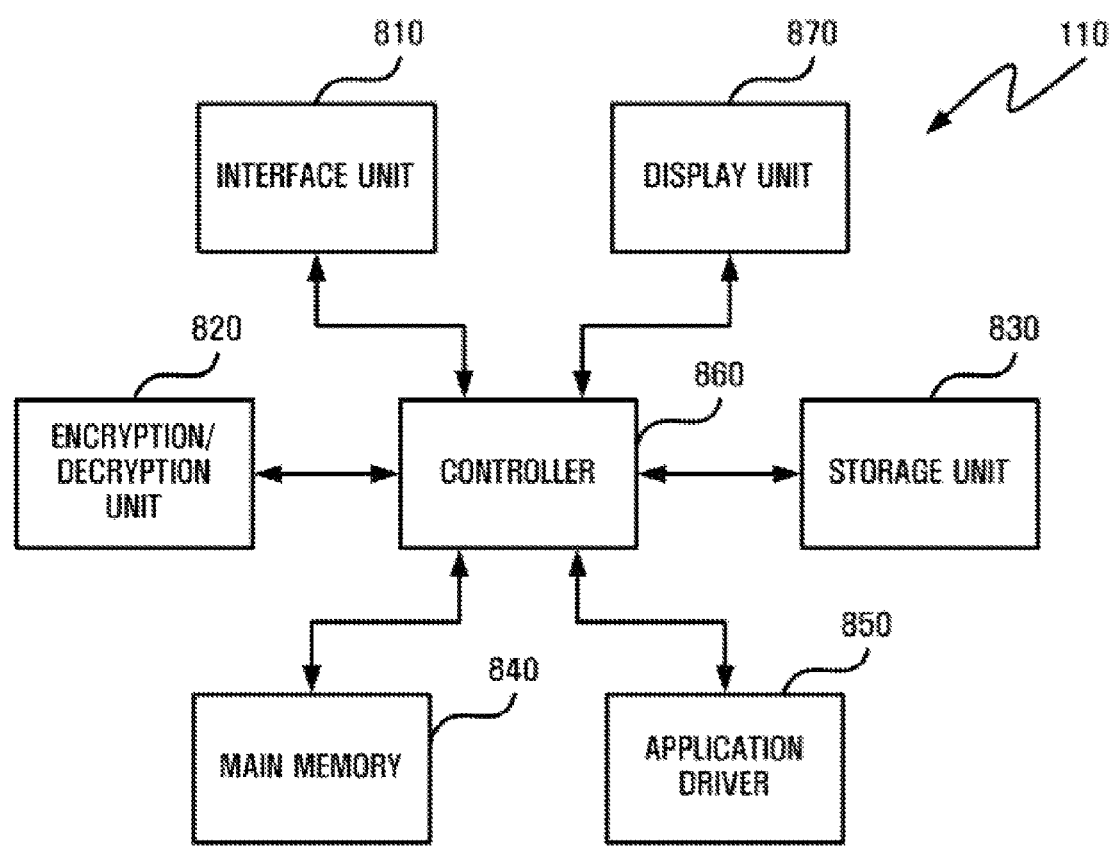
FIG. 8 is a block diagram of a host device according to an exemplary embodiment of the present invention.

FIG. 8 is a block diagram of the host device 110 according to an exemplary embodiment of the present invention. The host device 110 includes an interface unit 810, an encryption/decryption unit 820, a storage unit 830, a main memory 840, an application driver 850, a controller 860, and a display unit 870.

The interface unit 810 allows the host device 110 to connect with the portable storage device 120. Connection of the host device 110 with the portable storage unit 120 refers to a state in which electrical or magnetic communication may take place therebetween. Accordingly, "connect" may refer to a state of actual contact between the host device 110 and the portable storage device 120 for communication, and may also refer to a non-contact state in which communication therebetween is realized through a wireless medium. The host device 110 transmits to or receives from the portable storage device 120 various data, instructions, signals, and messages through the interface unit 810.

The encryption/decryption unit 820 performs encryption and decryption operations. Accordingly, the encryption/decryption unit 820 encrypts data to be sent to the portable storage device 120, or decrypts encrypted data received from the portable storage device 120. The encryption/decryption unit 820 may perform public-key cryptography as well as secret-key cryptography. In order to perform both types of cryptography, the host device 110 may include a plurality of encryption/decryption units. Further, the encryption/decryption unit 820 may generate random numbers required during mutual authentication operations. In addition, the encryption/decryption unit 820 may decrypt a context object using an RO stored in the portable storage device 120 in accordance with a request by a DRM application run by the application driver 850. Of course, this may be performed by a decrypting DRM application of the context object.

The storage unit 830 may store context objects, ROs, session context information, a certificate of the host device 110, a CRL, and data required to perform DRM tasks. In addition to a specific DRM application(s), the storage unit 830 may include other applications or at least one security storage region for logically or physically protecting access from other devices. The storage unit 830 may include a general storage region to which access is freely permitted. The storage unit 830 may be a non-volatile memory such as a flash memory.

The main memory 840 is a memory that stores or deletes codes, data, and information required during operation of the host device 110. An example of such a memory is RAM. Operation of the host device 110 encompasses running of a DRM application, performing mutual authentication, and performing DRM and other tasks.

The application driver 850 drives DRM applications. Software codes for driving DRM applications may be stored in the storage unit 830, and such software codes necessary to drive DRM applications may be loaded in the main memory 840. DRM applications driven by the application driver 850 may, together with DRM applications driven by the portable storage device 120, perform DRM tasks for playing back context objects using ROs. Although playing back of a context object may be performed by a DRM application, in some exemplary embodiments, a separate context play back unit is included in the host device 110 for such a purpose.

The controller 860 performs operations required to allow operation of the host device 110 in accordance with exemplary embodiments described above, and controls the structural elements forming the host device 110. The functioning of the controller 860 of the host device 110 is similar to that of the controller 760 of the portable storage device 120. However, it is not necessary for the controller 860 of the host device 110 to include functioning related to effectively utilizing a resource during conversion of the operating status of a DRM application.

The display unit 870 displays play back states of context objects. The display unit 870 may be a flat panel display apparatus such as an LCD or an EL display.

A more detailed description of the functions and operations of the structural elements forming the host device 110 may be more fully understood from the exemplary embodiments described above.

The structural elements forming the portable storage device 120 of FIG. 7 and the host device of FIG. 8 may be realized through modules. A module refers to software, or a hardware structural element such as a Field Programmable Gate Array (FPGA) or an Application Specific Integrate Circuit (ASIC), and may perform any function. However, a "module" is not limited to such software and hardware configurations. A module may be configured to reside in a storage medium that is able to perform addressing, and may be configured with the ability to run one or more processors. Accordingly, for example, a module may include structural elements such as software structural elements, object-oriented software structural elements, class structural elements, and task structural elements, and may include processes, functions, attributes, procedures, subroutines, segments of a program code, drivers, firmware, microcodes, circuits, data, databases, data structures, tables, arrays, and variables. The functions provided by the structural elements and modules may be combined using a smaller number of structural elements and modules, or may be further separated through additional structural elements and modules.

Although the present invention has been described in connection with the exemplary embodiments of the present invention with reference to the accompanying drawings, it will be apparent to those skilled in the art that various modifications and changes may be made thereto without departing from the scope and spirit of the invention. Therefore, it should be understood that the above exemplary embodiments are not limitative, but illustrative in all aspects.

What is claimed is:

1. A method of managing a resource of a portable storage device which is connected to a host device, the method comprising:

changing a status of a first Digital Rights Management (DRM) application into a ready status from an idle status by the portable storage device if task processing of the first DRM application is required by the host device; and changing the status of the first DRM application into a pending status and a status of a second DRM application into the ready status from the idle status by the portable storage device if task processing of the second DRM application is required by the host device, wherein the changing of the status the first DRM application into the ready status comprises:

allotting a first memory space in a main memory for task processing of the first DRM application;

establishing a first security session for the first DRM application; and transmitting and receiving messages to and from the host device through the first security session, and performing a DRM task of the first DRM application using the first memory space and in accordance with the messages transmitted and received through the first security session.

2. The method of claim 1, wherein the changing the status of the second DRM application into the ready status comprises:

storing security information for maintaining the first security session and a DRM task result of the first DRM application in a first security storage region;

freeing up the allotted first memory space;

allotting a second memory space in the main memory for task processing of the second DRM application;

establishing a second security session of the second DRM application; and transmitting and receiving messages to and from the host device through the second security session, and performing a DRM task of the second DRM application using the second memory space and in accordance with the messages transmitted and received through the second security session.

3. The method of claim 1, further comprising changing the status of the second DRM application into the pending status from the ready status and the status of the first DRM application into the ready status from the pending status if there is a requirement for the task processing of the first DRM application when the first DRM application is in the pending status.

4. A method of managing a resource of a portable storage device which is connected to a host device, the method comprising:

changing a status of a first Digital Rights Management (DRM) application into a ready status from an idle status by the portable storage device if task processing of the first DRM application is required by the host device; and changing the status of the first DRM application into a pending status and a status of a second DRM application into the ready status from the idle status by the portable storage device if task processing of the second DRM application is required by the host device, wherein the changing the status of the first DRM application into the ready status from the pending status comprises:

storing security information for maintaining a security session of the second DRM application and a DRM task result of the second DRM application in a security storage region;

freeing up the allotted second memory space for the second DRM application, and allotting a first memory space for task processing of the first DRM application; and transferring security information for maintaining a security session of the first DRM application and a prior DRM task result of the first DRM application from the security storage region to the first memory space.

5. A method of managing a resource of a portable storage device which is connected to a host device, the method comprising:

changing a status of a first Digital Rights Management (DRM) application into a ready status from an idle status by the portable storage device if task processing of the first DRM application is required by the host device;

changing the status of the first DRM application into a pending status and a status of a second DRM application into the ready status from the idle status by the portable storage device if task processing of the second DRM application is required by the host device, transmitting information related to a maximum buffer size of the portable storage device to the host device;

receiving information related to a buffer size to be used, from the host device; and receiving a message of the buffer size to be used, from the host device and performing a DRM task, wherein the buffer size to be used is not greater than the maximum buffer size.

6. The method of claim 5, wherein the maximum buffer size corresponds to a size of a memory space in a main memory of the portable storage device remaining after excluding from the main memory a memory space allotted for task processing of a DRM application in the ready status.

* * * * *